(12) United States Patent
Cha et al.

(10) Patent No.: US 7,830,451 B2
(45) Date of Patent: Nov. 9, 2010

(54) IMAGE PROCESSING APPARATUS AND IMAGE PROCESSING METHOD

(75) Inventors: Tae-hwan Cha, Yongin-si (KR); Eun-kyung Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1119 days.

(21) Appl. No.: 11/407,051

(22) Filed: Apr. 20, 2006

(65) Prior Publication Data

US 2007/0030386 A1 Feb. 8, 2007

(30) Foreign Application Priority Data

Jul. 4, 2005 (KR) .................... 10-2005-0059926

(51) Int. Cl.
*H04N 7/08* (2006.01)
*H04N 7/087* (2006.01)

(52) U.S. Cl. .............. 348/465; 348/468; 348/473; 348/461; 348/478

(58) Field of Classification Search ............. 348/465, 348/468, 473, 478, 461, 569; 725/136, 137
See application file for complete search history.

(56) References Cited

U.S. PATENT DOCUMENTS 5,428,400 A * 6/1995 Landis et al. ............... 348/569
6,256,072 B1 * 7/2001 Bae et al. .................... 348/568
7,391,470 B2 * 6/2008 Kim ........................... 348/465

FOREIGN PATENT DOCUMENTS

| CN | 1118645 A | 3/1996 |
|----|-----------|--------|
| KR | 100226838 B1 | 7/1999 |
| KR | 1020000046164 A | 7/2000 |
| KR | 102000006669 A | 11/2000 |
| KR | 100296929 B1 | 5/2001 |

* cited by examiner

*Primary Examiner*—David L Ometz
*Assistant Examiner*—Jean W Désir
(74) *Attorney, Agent, or Firm*—Roylance, Abrams, Berdo & Goodman, L.L.P.

(57) ABSTRACT

An image processing apparatus and an image processing method are provided for enhancing the picture quality of images by extracting additional information from non-standard signals without an error. A signal determination unit receives an image signal including an image interval containing an image and an additional information interval containing additional information regarding the image. A determination is made as to whether the additional information exists in the additional information interval. An additional information extractor extracts and outputs the additional information from the additional information interval, if the signal determination unit determines that the additional information exists in the additional information interval.

14 Claims, 5 Drawing Sheets

IMAGE PROCESSING APPARATUS AND IMAGE PROCESSING METHOD

CROSS-REFERENCE TO RELATED APPLICATIONS

This application claims the benefit under 35 U.S.C. §119(a) of Korean Patent Application No. 2005-0059926, filed on Jul. 4, 2005, in the Korean Intellectual Property Office, the entire disclosure of which is hereby incorporated by reference.

BACKGROUND OF INVENTION

1. Field of Invention

The present invention relates to an image processing apparatus and an image processing method. More particularly, the present invention relates to an image processing apparatus and an image processing method capable of enhancing picture quality of images by extracting additional information from non-standard signals without an error.

2. Description of the Related Art

Image processing apparatuses, such as TVs, receive image signals including predetermined images, according to a digital TV broadcast, a cable TV broadcast, and the like, from a broadcasting station. Image processing apparatuses also perform image processing on the received image signals, thus outputting the images. Image processing apparatuses can receive image signals from various image apparatuses, such as, a VCR, a DVD, and the like, and perform image processing on the image signals.

Figure 1:
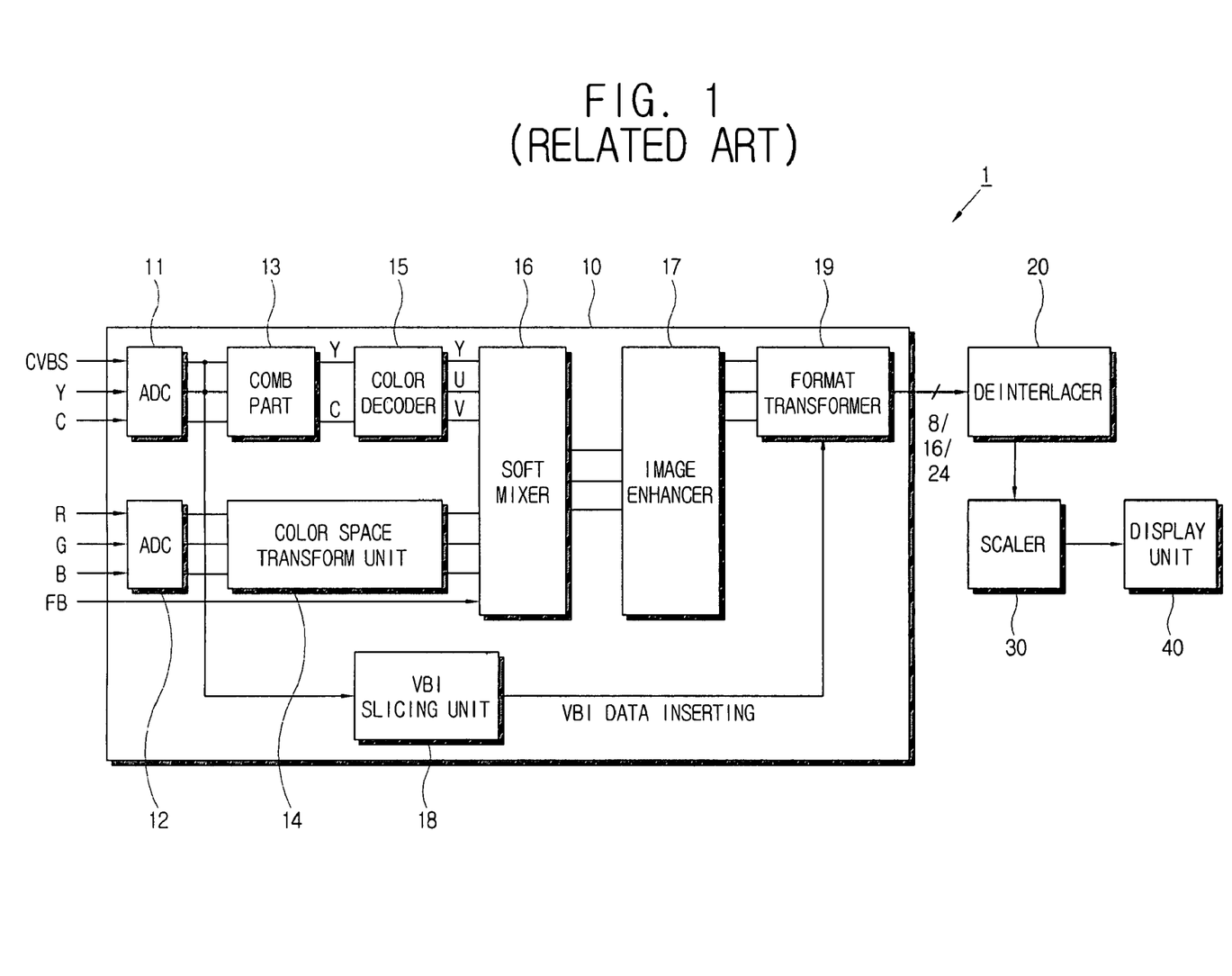
FIG. 1 is a block diagram of a conventional image processing apparatus.

FIG. 1 is a block diagram of a conventional image processing apparatus 1. The image processing apparatus 1 includes a video decoder 10 for receiving and decoding various image signals, a deinterlacer 20 for converting the decoded image signals into progressive signals, a scaler 30 for performing image processing in order to appropriately display the progressive signals, and a display unit 40 for displaying the image-processed signals.

The video decoder 10 includes two analog-to-digital converters (ADCs) 11 and 12 for receiving analog signals, such as, a Composite Video Baseband Signal (CVBS), a Y signal (luminance signal), a C signal (chrominance signal), and a RGB signal, and converting the analog signals into digital signals. The video decoder 10 also includes a comb unit for dividing the CVBS into a luminance signal and a chrominance signal; a color space transform unit 14 for converting the RGB signal into a YUV signal; a color decoder 15 for decoding encoded chrominance signals into original color signals; a soft mixer 16 for mixing the CVBS and the RGB signal; an image enhancer 17 for adjusting the sizes or offsets of signals; and a format transformer 19 for transforming the format of a signal required by a system to be output.

An image signal input to the video decoder 10 can include various additional information, as well as information regarding an image to be displayed on the display unit 40. For example, the additional information includes caption data (hereinafter, referred to as "closed caption data") for auditory challenged, a teletext, wide screen signal, vertical interval time code, and the like. The additional information can be included in the image signal in a vertical blanking interval (VBI). Particularly, the closed caption data is encoded in a 21st and/or 284th line of the image signal in accordance with a National Television System Committee (NTSC) television system.

Figure 2:
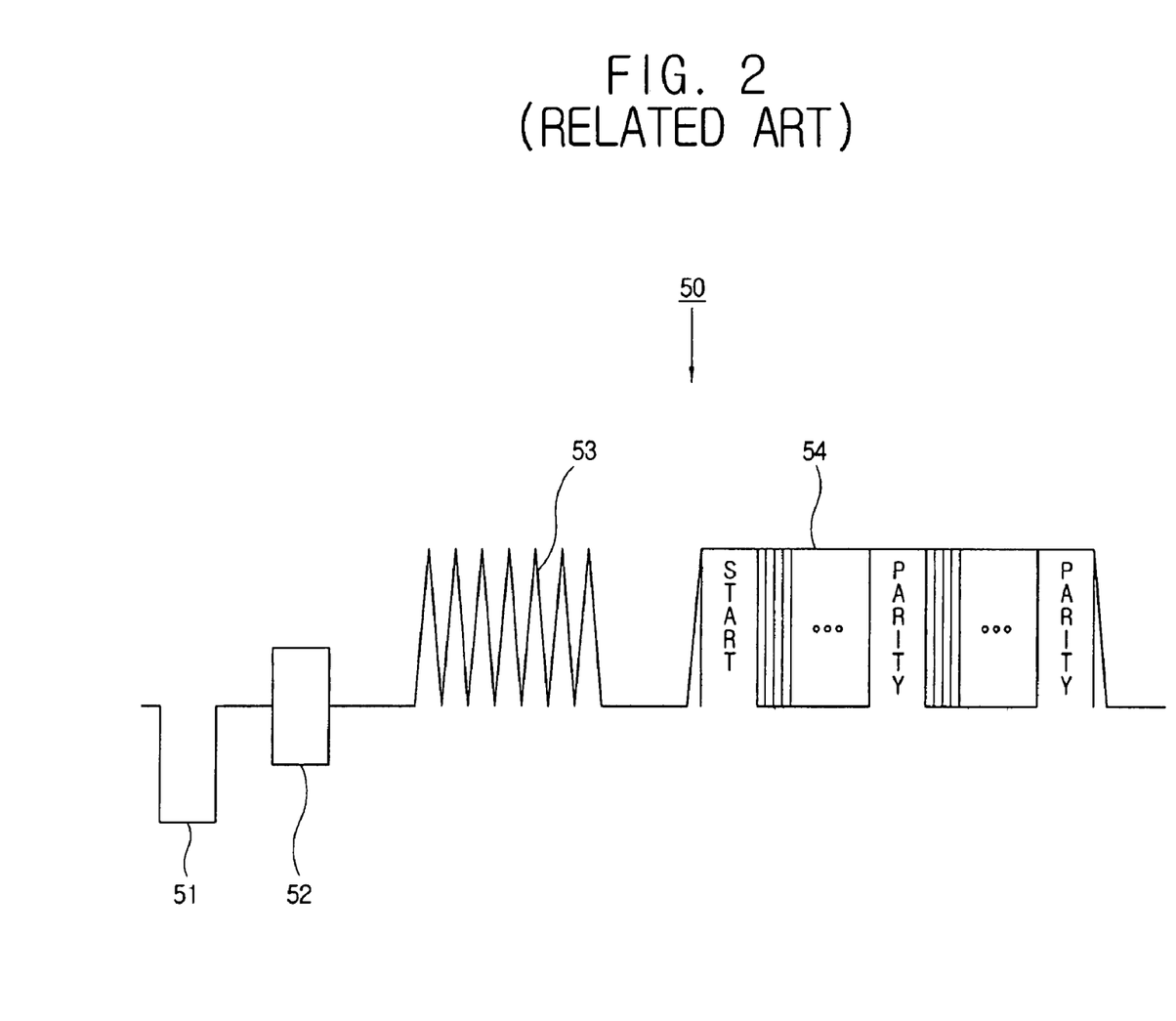
FIG. 2 is a waveform diagram illustrating a 21st line including caption data in a Composite Video Baseband Signal (CVBS)

The video decoder 10 of the conventional image processing apparatus 1 includes a VBI slicing unit 18 in correspondence to the additional information. The VBI slicing unit 18 receives and decodes the image signal output from the ADC 11, extracts additional information from the decoded image signal, and outputs the additional information to the format transformer 19. FIG. 2 is a waveform diagram illustrating the 21st line including closed caption data in a CVBS 50. A portion of the image signal 50 corresponding to the 21st line includes a color burst signal 52, a clock run-in signal 53, and caption data 54, which is additional information. The clock run-in signal 53 is a sinusoidal signal with maximal and minimal values respectively quantized to logic values "1" and "0," and has 7 waveforms with a clock frequency 503 KHz. The caption data 54 has a start bit "001" and 16 bits of data (two ASCII data and two parities). In FIG. 2, reference numeral 51 represents a synchronous signal. The VBI slicing unit 18 decodes the input image signal in synchronization with the clock run-in signal 53, thus extracting the caption data 54 from the image signal.

Figure 3:
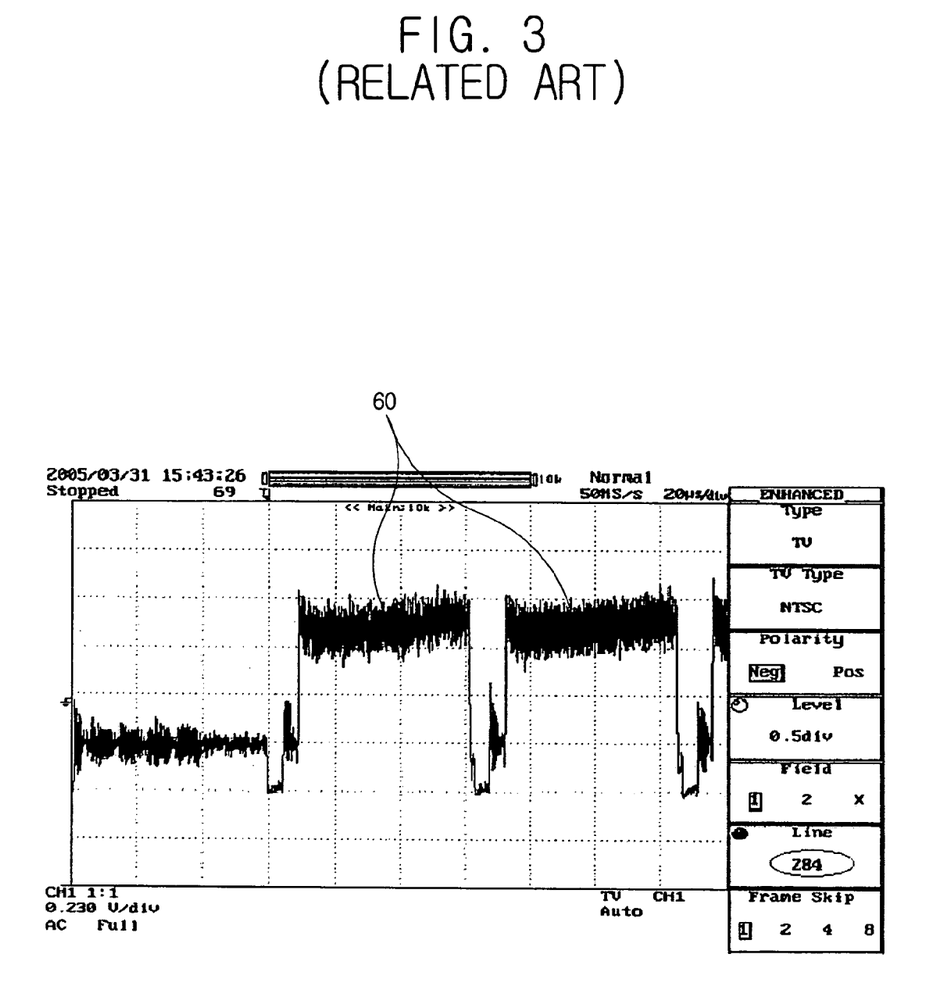
FIG. 3 is a waveform diagram illustrating a 284th line of a VCR output signal.

The image signal input to the video decoder 10 may be a standard signal based on an international standard, or a non-standard signal not based on the international standard. The non-standard signal may be an output signal of a VCR, or an RF broadcasting signal used in some regions of America. The non-standard signal can include additional information, such as the caption data 54, other than an image. However, the output signal of the VCR, among the non-standard signals, can have an active video signal, instead of null data, in the signal's 284th line when the closed caption data 54 is encoded in the 21st line of the VCR output signal, which is different from standard signals in which null data are encoded in their 284th lines. The waveform of the 284th line of the VCR output signal is shown in FIG. 3. In FIG. 3, reference numeral 60 represents an active video signal.

The VBI slicing unit 18 attempts to decode and extract the corresponding signal in the 284th line, in the same manner as the operation of decoding the closed caption data 54 in the 21st line. However, since the active video signal has a format different from the closed caption data 54, an error occurs when the VBI slicing unit 18 extracts caption data. Thus, broken characters are displayed instead of correct caption data, although the caption data is extracted.

Accordingly, there is a need for an improved image processing apparatus and image processing method that extracts caption data without producing errors.

SUMMARY OF THE INVENTION

An aspect of embodiments of the present invention is to address at least the above problems and/or disadvantages and to provide at least the advantages described below. Accordingly, an aspect of embodiments of the present invention is to provide an image processing apparatus and an image processing method, which are capable of enhancing the picture quality of images by extracting additional information from non-standard signals without an error.

The foregoing and/or other aspects of an exemplary embodiment of the present invention can be achieved by providing an image processing apparatus comprising a signal determination unit receiving an image signal including an image interval containing an image and an additional information interval containing additional information regarding the image, and determining whether the additional information exists in the additional information interval. An additional information extractor extracts and outputs the additional information from the additional information interval, if the signal determination unit determines that the additional information exists in the additional information interval.

According to an aspect of an exemplary embodiment of the present invention, the additional information interval is included in a vertical blanking interval (VBI).

According to an aspect of an exemplary embodiment of the present invention, the image signal contains a unit image formed of a plurality of lines, and the signal determination unit and the additional information extractor determines that an interval of the image signal, corresponding to a predetermined line of the plurality of the lines, is the additional information interval.

According to an aspect of an exemplary embodiment of the present invention, the image signal in the additional information interval includes a signal indicating whether the additional information exists and a signal corresponding to the additional information. The signal determination unit detects the signal indicating whether the additional information exists in the additional information interval.

According to an aspect of an exemplary embodiment of the present invention, the additional information includes display information regarding the image, and the image processing apparatus further includes a display unit. An image processor performs image processing on the image and the display information so that the display information is displayed with the image on the display unit.

According to an aspect of an exemplary embodiment of the present invention, the additional information extractor outputs null data so that the display information is not displayed on the display unit, if the signal determination unit determines that the display information does not exist in the additional information interval.

According to an aspect of an exemplary embodiment of the present invention, the additional information includes control information regarding the image, and the image processing apparatus further includes a display unit. An image processor performs image processing on the image based on the control information so that the image is displayed on the display unit.

The foregoing and/or other aspects of an exemplary embodiment of the present invention can also be achieved by providing an image processing method comprising receiving an image signal including an image interval containing an image and an additional information interval containing additional information regarding the image. A determination is made as to whether the additional information exists in the additional information interval of the image signal. The additional information is extracted and output from the additional information interval, if the additional information exists in the additional information interval.

According to an aspect of an exemplary embodiment of the present invention, the additional information interval is included in a (VBI).

According to an aspect of an exemplary embodiment of the present invention, the image signal contains a unit image formed of a plurality of lines. An interval of the image signal corresponding to a predetermined line of the plurality of the lines is determined as the additional information interval, in the determining of whether the additional information exists in the additional information interval and the extracting and outputting of the additional information.

According to an aspect of an exemplary embodiment of the present invention, the image signal in the additional information interval includes a signal indicating whether the additional information exists and a signal corresponding to the additional information. The signal indicating whether the additional information exists in the additional information interval is detected in the determining of whether the additional information exists in the additional information interval.

According to an aspect of an exemplary embodiment of the present invention, the additional information includes display information regarding the image. The image processing further includes performing image processing on the image and the display information so that the display information is displayed with the image.

According to an aspect of an exemplary embodiment of the present invention, the extracting and outputting of the additional information further includes outputting null data so that the display information is not displayed, if a determination is made that the display information does not exist in the additional information interval.

According to an aspect of an exemplary embodiment of the present invention, the additional information includes control information regarding the image. The image processing further includes performing image processing on the image based on the control information so that the image is displayed.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the prevent invention will be more apparent from the following description taken in conjunction with the accompany drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 4:
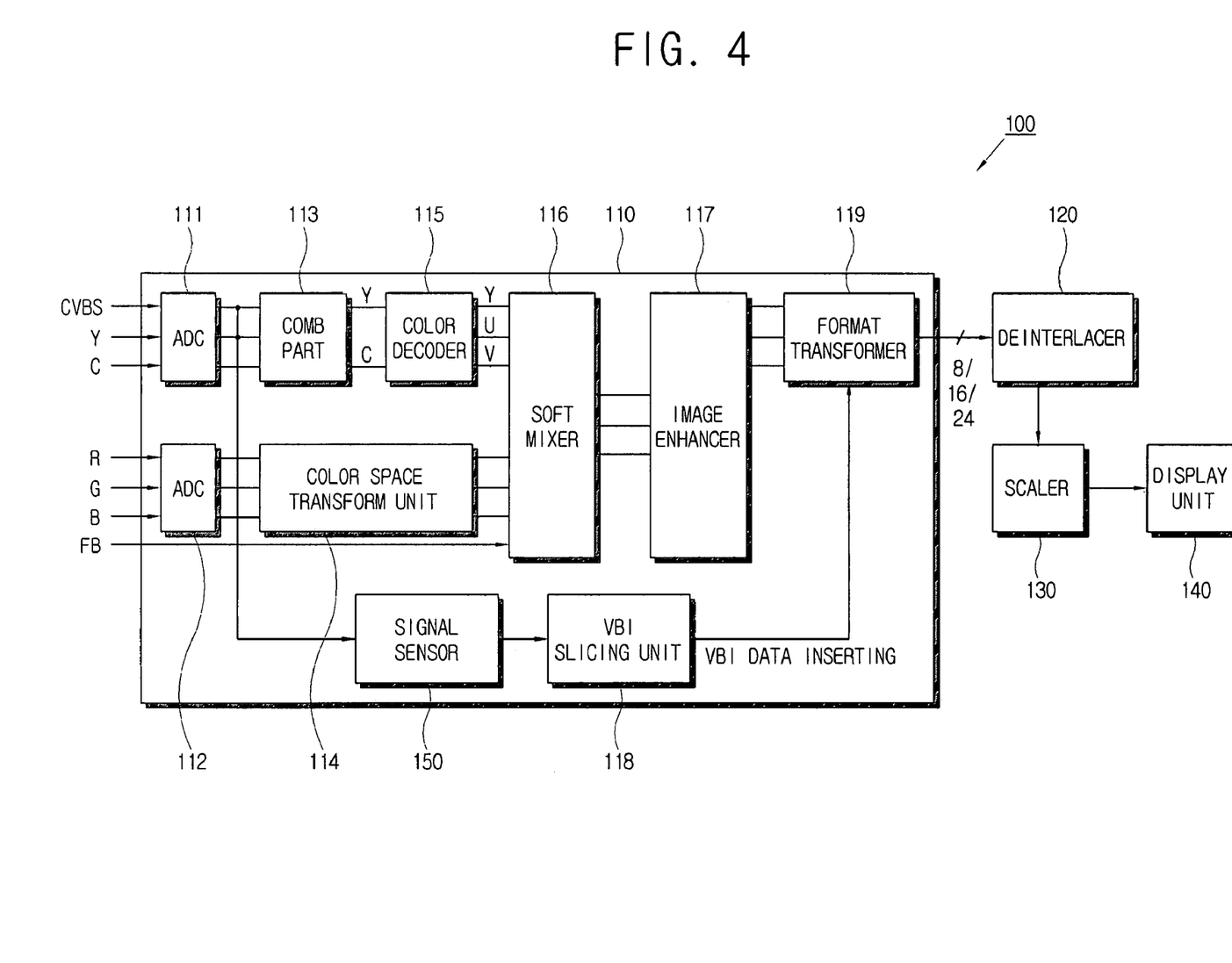
FIG. 4 is a block diagram of an image processing apparatus according to an exemplary embodiment of the present invention.

FIG. 4 is a block diagram of an image processing apparatus 100 according to an exemplary embodiment of the present invention. The image processing apparatus 100 receives image signals, including predetermined images, according to a digital TV broadcast, a cable TV broadcast, and the like, from a broadcasting station, or receives image signals from various image apparatuses, such as a VCR, a DVD, and the like. The image processing apparatus 100 then performs image processing on the received image signals, thus outputting the images. For example, the image processing apparatus 100 according to an exemplary embodiment of the present provides high-quality images without errors, when non-standard signals, as well as standard signals, are received in accordance with an image signal format containing additional information, such as closed caption data, as well as images. The image processing apparatus 100 can be implemented by a TV system.

Referring to FIG. 4, the image processing apparatus 100 includes a video decoder 110, a deinterlacer 120, a scaler 130, and a display unit 140. The video decoder 110 receives image signals having various formats, performs appropriate decoding on the received images signals, and obtains images encoded in the image signals and additional information for the images.

The deinterlacer 120 is connected to an output terminal of the video decoder 110 and receives the output signal of the video decoder 110. The deinterlacer 120 performs deinterlacing on an image signal decoded by the video decoder 110. That is, the deinterlacer 120 converts an interlaced image into a non-interlaced image, which is a progressive image. The type of deinterlacer 120 depends on the type of display unit 140 provided. The deinterlacer 120 can be omitted if the display unit 140 is implemented by a Cathode Ray Tube (CRT) for displaying interlaced images.

The scaler 130 is connected to an output terminal of the deinterlacer 120 and receives the output signal of the deinterlacer 120. The scaler 130 performs appropriate image processing on the received output signal and allows an image, based on the image-processed signal, to be correctly displayed on the display unit 140. The display unit 140 receives the image-processed signal from the scaler 130 and displays the image, based on the image-processed signal.

Referring to FIG. 4, the video decoder 110 includes two analog-to-digital converters (ADCs) 111 and 112, a comb unit 113, a color space transform unit 114, a color decoder 115, a soft mixer 116, an image enhancer 117, and a format transformer 119. Each of the ADCs 111 and 112 receives analog signals having various formats and converts the analog signals into digital image signals.

The ADC 111 receives a Composite Video Baseband Signal (CVBS) which is an analog television signal before being modulated and carried by an RF carrier; a Y signal which corresponds to a luminance component of the analog television signal; and a C signal which corresponds to a chrominance component of the analog television signal. The ADC 111 then performs an analog-to-digital conversion on the received signals. The ADC 112 directly receives RGB signals from an image apparatus such as a computer system, and performs an analog-to-digital conversion on the RGB signals.

The comb unit 113 is disposed at an output terminal of the ADC 111 and receives the output signal of the ADC 111. If the received signal is a CVBS, the comb unit 113 divides the CVBS into a luminance signal (Y signal) and a chrominance signal (C signal). The color decoder 115 is disposed at an output terminal of the comb unit 113, receives the luminance signal (Y signal) and the chrominance signal (C signal), which are the output signals of the comb unit 113, and decodes the received chrominance signal (C signal). The color decoder 115 then extracts and outputs an original color difference signal encoded in the chrominance signal (C signal). The color difference signal includes I and Q signals in accordance with a National Television System Committee (NTSC) television system, and includes U and V signals in accordance with a Phase-Alternating Line (PAL) and other systems.

The color space transform unit 114 is disposed at an output terminal of the ADC 112, receives the output signal of the ADC 112, and performs a conversion in color space on an input RGB signal, thus converting the RGB signal, for example, into a YUV signal. The soft mixer 116 is disposed at output terminals of the color decoder 115 and the color space transform unit 114. The soft mixer 116 receives the output signals of the color decoder 115 and the color space transform unit 114, and also receives a selection signal FB (Fast Blank) representing a user's selection. The soft mixer 116 selectively outputs image signals received from at least one of the color decoder 115 and the color space transform unit 114, according to the selection signal FB.

The image enhancer 117 is disposed at an output terminal of the soft mixer 116. The image enhancer 117 receives the output signal of the soft mixer 116, and adjusts the size or offset of the received image signal according to a predetermined setting. Also, the image enhancer 117 can adjust the characteristics, such as contrast, brightness, saturation, hue, and the like, of the received image signal, in order to improve the picture quality of images.

The format transformer 119 is disposed at an output terminal of the image enhancer 117. The format transformer 119 receives the output signal of the image enhancer 117, appropriately transforms the format of the received image signal, and provides the transformed result to the deinterlacer 120. For example, the format transformer 119 transforms and outputs the image signal so that a bit number (for example, 8 bits, 16 bits, and 24 bits) of the image signal is suitable for a predetermined setting, adjusts the output order of the Y, U, and V signals, and sets the signals levels.

The image processing apparatus 100 according to an exemplary embodiment of the present invention includes a signal sensor 150 and a Vertical Blanking Interval (VBI) slicing unit 118. The signal sensor 150 receives a luminance signal (Y signal) among the output signals of the ADC 111 and determines whether additional information exists in the received luminance signal (Y signal). In an exemplary implementation, the luminance signal (Y signal) includes various additional information as well as an image to be displayed on the display unit 140. The additional information may be closed caption data, which is an example of display information. The closed caption data is contained in an image signal in a vertical blanking interval. The closed caption data is encoded in the 21st line of an image signal 50 as illustrated in FIG. 2, in accordance with the NTSC television system. In an exemplary implementation, the interval of the image signal 50, in which the closed caption data is encoded, corresponds to an additional information interval. Also, the remaining image signal interval, except for the additional information interval, corresponds to an image interval.

Referring to FIGS. 2 and 4, the VBI slicing unit 118 detects a 21st line of the image signal 50 in response to a sync signal 51. The VBI slicing unit 118 performs decoding in synchronization with a clock run-in signal 53, and extracts caption data 54. The VBI slicing unit 118 provides the extracted caption data 54 to the format transformer 119. The format transformer 119 inserts the caption data 54 into a predetermined location of an output signal, according to a predetermined format, and outputs a resultant signal. The caption data 54 is image-processed by the scaler 130 and displayed with the image through the display unit 140. The format transformer 119, the deinterlacer 120, and the scaler 130, according to an exemplary embodiment of the present invention, are examples of image processors.

The additional information according to an exemplary embodiment of the present invention may include, other than the closed caption data, a teletext, wide screen signal, vertical interval time code, and the like. The scaler 130 appropriately processes an image based on a wide screen signal, which is an example of control information according to an exemplary embodiment of the present invention.

The VBI slicing unit 118 according to an exemplary embodiment of the present invention decodes the image signal at a predetermined location, and extracts and outputs additional information, such as, a teletext, a wide screen signal, a vertical interval time code, and the like, from the image signal. At least one of the additional information is encoded in the 284th line of the image signal. The VBI slicing unit 118 extracts different additional information from the 284th line of the image signal, in a similar manner as the operation of extracting the closed caption data from the 21st line of the image signal.

The video decoder 110, according to an exemplary embodiment of the present invention, receives non-standard signals (for example, an image signal output from a VCR) not based on the international standard, as well as standard signals based on an international standard. The image signal (also, referred to as a VCR signal) output from the VCR includes closed caption data 54 in the signal's 21st line, and an active video signal in the signal's 284th line. The signal sensor 150 is disposed in front of the VBI slicing unit 118. The signal sensor 150 receives the VCR signal, detects the 284th line of the VCR signal in response to a sync signal of the VCR signal, and determines whether a clock run-in signal 53, as shown of FIG. 2, corresponding to 7 sinusoidal waveforms with a predetermined frequency, exists in the 284th line. If the clock run-in signal 53 does not exist in the 284th line, the signal sensor 150 notifies the VBI slicing unit 118 that the clock run-in signal does not exist. If a notification, indicating that the clock run-in signal does not exist in the 284th line, is received from the signal sensor 150, the VBI slicing unit 118 discards data extracted as additional information from the 284th line, and outputs null data as additional information.

That is, the VBI slicing unit 118 normally operates to extract additional information, if a clock run-in signal 53 exists in the 284th line, and outputs null data as additional information if a clock run-in 53 signal does not exist, according to a notification from the signal sensor 150. The clock run-in signal is an example of a signal indicating whether additional information exists. Also, the signal sensor 150 and the VBI slicing unit 118 are examples of a signal determination unit and an additional information extractor, respectively.

As described above, in the image processing apparatus 100, according to an exemplary embodiment of the present invention, high-quality images are possibly provided, since caption data can be extracted from non-standard signals, such as output signals of a VCR, without an error.

Figure 5:
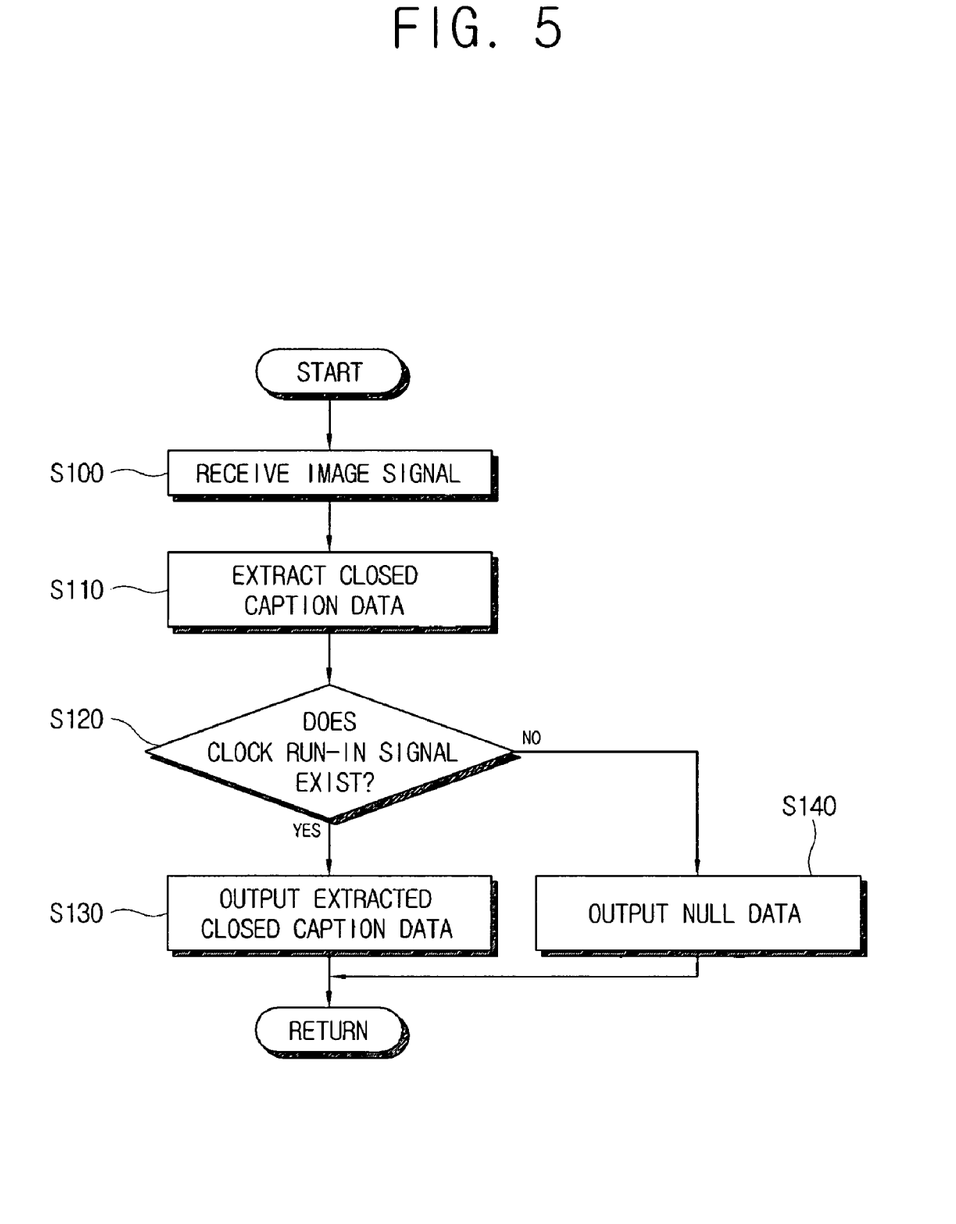
FIG. 5 is a flowchart illustrating a main operation of the image processing apparatus according to an exemplary embodiment of the present invention.

FIG. 5 is a flowchart schematically illustrating the image processing apparatus 100 main operation according to an exemplary embodiment of the present invention. The video decoder 110 of the image processing apparatus 100 receives an image signal in which various additional information, including an output signal of a VCR, are encoded (operation S100). The VBI slicing unit 118 extracts, as additional information, information included in a specific line of an image signal received through the ADC 111 and the signal sensor 150 (operation S110). When the output signal of the VCR is received, the VBI slicing unit 118 extracts closed caption data from the 21st and 284th lines of the output signal of the VCR.

The signal sensor 150 receives the image signal, determines whether a clock run-in signal 53 exists in the 284th line, and transmits a determination result to the VBI slicing unit 118 (operation S120). If the signal sensor 150 determines that a clock run-in signal 53 exists in the 284th line (operation S120), the VBI slicing unit 118 normally operates to extract data corresponding to additional information, such as closed caption data, and outputs the data to the format transformer 119 (operation S130). If the signal sensor 150 determines that the clock run-in signal 53 does not exist in the 284th line (operation S120), the VBI slicing unit 118 instead outputs null data as additional information to the format transformer 119 (operation S140).

For example, the image processing apparatus, according to an exemplary embodiment of the present invention, is not limited to a TV system, and can be implemented by various devices, such as a VBI slicer, a video decoder, a microcomputer, and the like, including a signal sensor 150 and a VBI slicing unit 118.

As described above, in an image processing apparatus and an image processing method, according to exemplary embodiments of the present invention, by extracting additional information from non-standard signals, without an error, it is possible to improve the picture quality of images.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image processing apparatus comprising:
    a signal determination unit for receiving an image signal comprising an image interval for containing an image and an additional information interval for containing additional information regarding the image, and determining whether the additional information exists in the additional information interval; and
    an additional information extractor for extracting and outputting the additional information from the additional information interval, if the signal determination unit determines that the additional information exists in the additional information interval, and outputting null data as the additional information if the signal determination unit determines that the additional information does not exist in the additional information interval,
    wherein the signal determination unit determines that the additional information exists in the additional information interval if at least one sinusoidal waveform exists.

2. The image processing apparatus according to claim 1, wherein the additional information interval is comprised in a vertical blanking interval.

3. The image processing apparatus according to claim 1, wherein the image signal contains a unit image formed of a plurality of lines, and
    the signal determination unit and the additional information extractor determine that an interval of the image signal, corresponding to a predetermined line of the plurality of the lines, is the additional information interval.

4. The image processing apparatus according to claim 1, wherein the image signal in the additional information interval comprises a signal indicating whether the additional information exists and a signal corresponding to the additional information, and
    the signal determination unit detects the signal indicating whether the additional information exists in the additional information interval.

5. The image processing apparatus according to claim 1, wherein the additional information comprises display information regarding the image, and the image processing apparatus further comprising:
a display unit; and
an image processor for performing image processing on the image and the display information so that the display information is displayed with the image on the display unit.

6. The image processing apparatus according to claim 5, wherein the additional information extractor outputs null data so that the display information is not displayed on the display unit, if the signal determination unit determines that the display information does not exist in the additional information interval.

7. The image processing apparatus according to claim 1, wherein the additional information comprises control information regarding the image, and
the image processing apparatus further comprising:
a display unit; and
an image processor for performing image processing on the image based on the control information so that the image is displayed on the display unit.

8. An image processing method comprising the steps of:
receiving an image signal comprising an image interval for containing an image and an additional information interval for containing additional information regarding the image;
determining whether the additional information exists in the additional information interval of the image signal; and
extracting and outputting the additional information from the additional information interval, if the additional information exists in the additional information interval, and outputting null data as the additional information if additional information does not exist in the additional information interval,
wherein the determining step comprises determining whether the additional information exists in the additional information interval if at least one sinusoidal waveform exists.

9. The image processing method according to claim 8, wherein the additional information interval is comprised in a vertical blanking interval.

10. The image processing method according to claim 8, wherein the image signal contains a unit image formed of a plurality of lines, and
an interval of the image signal, corresponding to a predetermined line of the plurality of lines, is determined as the additional information interval in the step of determining whether the additional information exists in the additional information interval and the extracting and outputting of the additional information.

11. The image processing method according to claim 8, wherein the image signal in the additional information interval comprises a signal indicating whether the additional information exists and a signal corresponding to the additional information, and
detecting the signal indicating whether the additional information exists in the additional information interval in the step of determining whether the additional information exists in the additional information interval.

12. The image processing method according to claim 8, wherein the additional information comprises display information regarding the image, and
the image processing method further comprising performing image processing on the image and the display information so that the display information is displayed with the image.

13. The image processing method according to claim 12, wherein the extracting and outputting of the additional information further comprises:
outputting null data so that the display information is not displayed, if a determination is made that the display information does not exist in the additional information interval.

14. The image processing method according to claim 8, wherein the additional information comprises control information regarding the image, and
the image processing method further comprising performing image processing on the image based on the control information so that the image is displayed.

* * * * *